United States Patent [19]

McRae

[11] Patent Number: 5,038,918

[45] Date of Patent: Aug. 13, 1991

[54] ROOT CROP HARVESTER

[75] Inventor: Douglas C. McRae, Midlothian, United Kingdom

[73] Assignee: National Research Development Corporation, London, England

[21] Appl. No.: 439,675

[22] Filed: Nov. 22, 1989

[30] Foreign Application Priority Data

Dec. 2, 1988 [GB] United Kingdom ............. 8828154.8

[51] Int. Cl.$^5$ ............................................. B65G 27/34
[52] U.S. Cl. .................................... 198/586; 198/609; 198/631
[58] Field of Search ..................... 198/631, 586, 609

[56] References Cited

FOREIGN PATENT DOCUMENTS

| 2634123 | 2/1977 | Fed. Rep. of Germany ...... 198/631 |
| 2048040 | 12/1980 | United Kingdom . |
| 2106363 | 4/1983 | United Kingdom . |
| 2134763 | 8/1984 | United Kingdom . |
| 2208994 | 4/1989 | United Kingdom . |

Primary Examiner—D. Glenn Dayoan
Attorney, Agent, or Firm—Cushman, Darby & Cushman

[57] ABSTRACT

A root crop harvester including two endless web sections, with the first section overhanging the second section to form a step portion, and drive mechanism to vibrate the two web sections in their own planes by amounts that are unequal or can be made unequal (or equal) to suit the prevailing conditions.

6 Claims, 1 Drawing Sheet

ROOT CROP HARVESTER

BACKGROUND OF THE INVENTION

The present invention relates to root crop harvesters within which term is to be included potato harvesters.

Co-pending U.K. Published Application GB 2208994A (National Research Development Corporation) discloses a root crop harvester in which the initial web is divided into two sections with the first overhanging the second to form a step portion.

SUMMARY OF THE INVENTION

According to the present invention, a root crop harvester includes two web sections, with the first section overhanging the second section to form a step portion, and drive means to vibrate the two web sections in their own planes preferably in antiphase to one another) by amounts that are unequal or can be made unequal (or equal to suit the prevailing conditions.

Conveniently, only one of the two sections is externally driven in its vibratory motion, the other section deriving its vibratory motion from the first section via a transfer mechanism.

Conveniently, the transfer mechanism comprises a link connected at either end with supporting frameworks for the two web sections and pivoted about a point other than the mid-point of the link (or adapted to be so pivoted if the ambient conditions so require).

BRIEF DESCRIPTION OF THE DRAWING

Embodiments of the invention will now be described, by way of example only, with reference to the accompanying drawing in which.

DETAILED DESCRIPTION OF THE PRESENTLY PREFERRED EXEMPLARY EMBODIMENT

Figure 1:
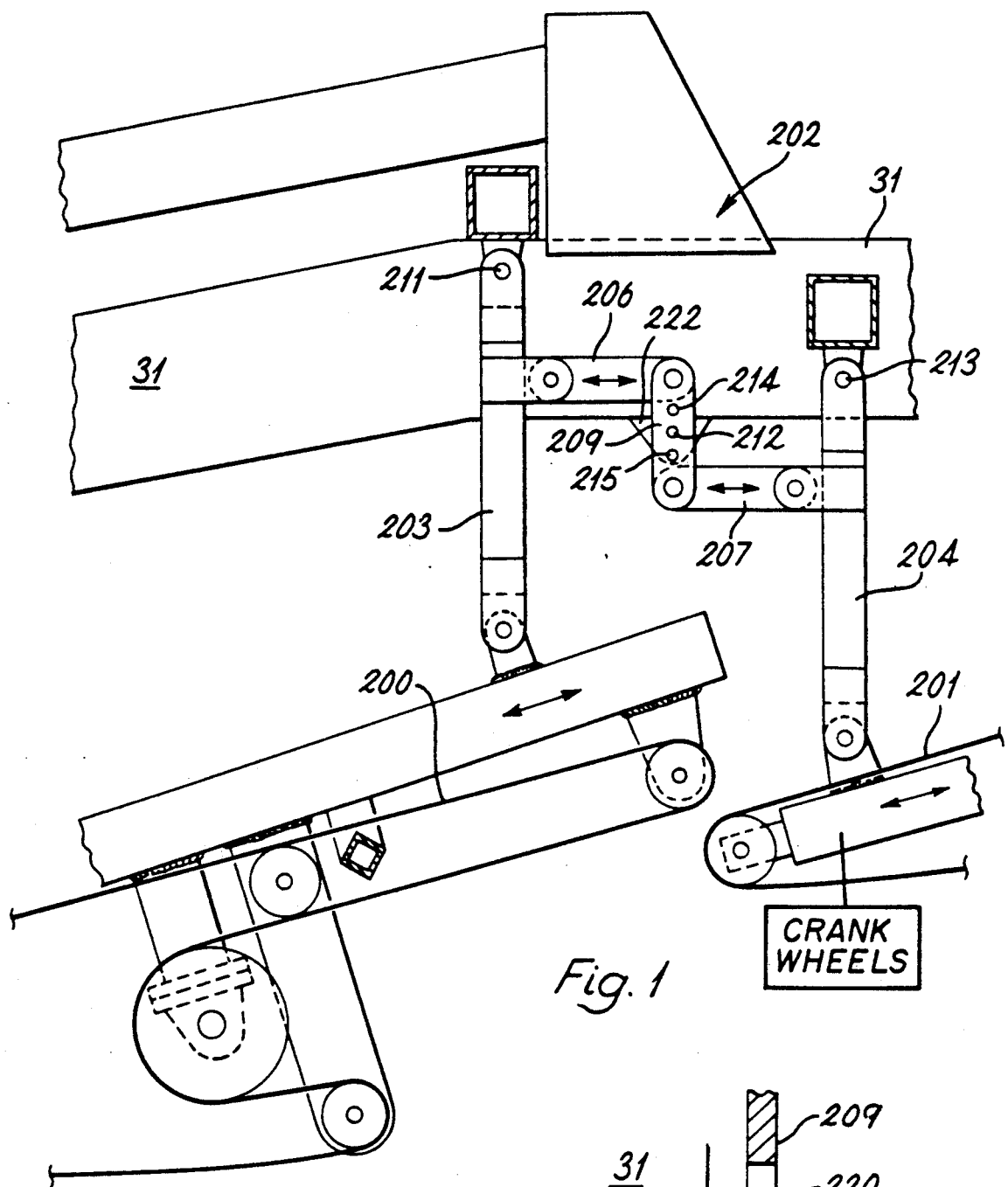
FIG. 1 shows the step-defining portion of two web sections of the harvester in a first embodiment and the means for varying the relative amplitude of their in-plane vibrations.

Thus, referring now to the drawings, FIG. 1 shows the initial web of a potato harvester split into a primary section 200 and an intermediate section 201 arranged to provide an overhanging step portion as illustrated.

The support structures for the two web sections at this point are interconnected by a link assembly 202 comprising two equal length hangers 203,204, two equal length connecting links 206,207 and a crank link 209 joining together the adjacent ends of the connecting links. These various items are pivotally connected to the main frame 31 at 211,212,213. Elsewhere, as shown, they are pivotally connected either to one another or to the support structures for the primary and intermediate web sections 200,201.

The intermediate web 201 is vibrated by two crank-wheels (not shown) supported side-by-side on main frame uprights and connected to a primary web hanger (not shown) by a horizontal connecting crank.

Typically, the drive to the crank-wheels might comprise a hydraulic motor which can be run at a range of speeds. A typical speed would be 200-220 rpm giving an oscillation frequency of 3.3 Hz to the connecting crank.

Two ranges of oscillation amplitude for the primary web are available by a rotation of up to 180° of a cam plate within the crank wheels. These ranges may typically be from zero to 35 mm or from 65 mm to 100 mm.

The presence of crank link 209 and the choice of equal length hangers and connecting links ensures that when the hanger is centrally pivoted at 212 as illustrated in the drawing, the primary and intermediate web sections 200,201 will, in operation, oscillate by equal amounts. However, when dissimilar amplitudes are required, then the link 209 may be repivoted either about aperture 214 to decrease the amplitude of the primary web section or about aperture 215 if the opposite effect is required.

By way of example, with the intermediate web section 201 driven at a 35 mm amplitude, the amplitude of the primary web section might be changed from the 35 mm value associated with the 212 pivot position, to, say, 20 mm for the 214 pivot position or 50 mm, say, for the 215 pivot position.

Figure 2:
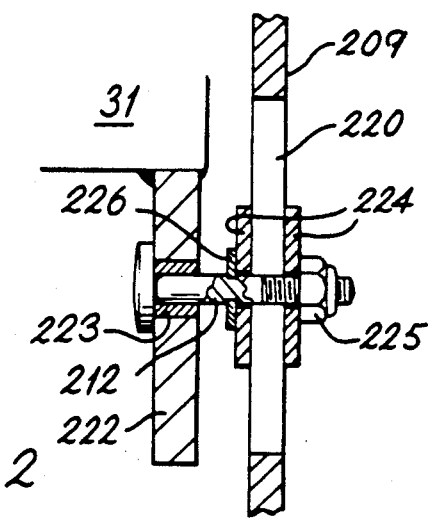
FIG. 2 shows a detail of a second embodiment.

In the alternative embodiment of FIG. 2, the middle three holes of the link 209 are replaced by a slot 220 to allow a limited range of continuous adjustment of the position of the link 209 relative to the pivot 212.

Reference numeral 222 indicates a lug depending from the main frame 31 to provide a rotary support for the pivot 212, a bush 223 being provided in the lug aperture. Reference numerals 224 225 respectively indicate two slider plates and a locking nut for rigidly securing the link 209 to pivot 212 at the desired location in the slot 220. The arrangement is completed by a retaining clip 226.

In a variation (not shown) of this second embodiment, the plates 224 are lengthened and carry an additional clamping bolt extending between the two plates.

In another variation (not shown), of the second embodiment, the position of the link 209 relative to pivot 212 is remotely controlled by means of a hydraulic ram or linear actuator.

I claim:

1. A root crop harvester comprising
   two endless web sections having a common direction of travel and overlapping in said direction of travel so that the first section overhangs the second section to form a step portion, and
   drive means for vibrating the two web sections in their own planes,
   said drive means being adjustable so that the amount by which each of the two web sections is vibrated with respect to one another can be varied,
   said web vibrations being parallel to said direction of travel.

2. A harvester as claimed in claim 1 in which the drive means is operative to vibrate the two web sections in antiphase to one another.

3. A harvester as claimed in claim 1 wherein said drive means comprises means for vibrating one of said web sections and transfer means for transferring the vibratory motion of said one web section to the other of said web sections.

4. A harvester as claimed in claim 3 wherein supporting framework means are provided for supporting said two web sections, said transfer means comprising a link having first and second ends, said ends of said link being operatively coupled to said supporting framework means, said link being pivotally coupled at a point therealong to said supporting framework means.

5. A harvester as claimed in claim 2 wherein said drive means comprises means for vibrating one of said two web sections and transfer means for transferring the vibratory motion of said one web section to the other of said web sections.

6. A harvester as claimed in claim 5 wherein supporting framework means are provided for supporting said two web sections, said transfer means comprising a link having first and second ends, said ends of said link being operatively coupled to said supporting framework means, said link being pivotally coupled at a point therealong to said supporting framework means.

* * * * *